US011041831B2

(12) United States Patent
Kitazawa et al.

(10) Patent No.: US 11,041,831 B2
(45) Date of Patent: Jun. 22, 2021

(54) ULTRASONIC PROBE, ULTRASONIC FLAW DETECTION APPARATUS AND METHOD

(71) Applicant: Hitachi-GE Nuclear Energy, Ltd., Hitachi (JP)

(72) Inventors: Sou Kitazawa, Tokyo (JP); Hidetaka Komuro, Hitachi (JP); Junichiro Naganuma, Hitachi (JP)

(73) Assignee: Hitachi-GE Nuclear Energy, Ltd., Hitachi (JP)

( * ) Notice: Subject to any disclaimer, the term of this patent is extended or adjusted under 35 U.S.C. 154(b) by 470 days.

(21) Appl. No.: 16/118,060

(22) Filed: Aug. 30, 2018

(65) Prior Publication Data

US 2019/0072526 A1 Mar. 7, 2019

(30) Foreign Application Priority Data

Sep. 1, 2017 (JP) ............................ JP2017-168873

(51) Int. Cl.

| | |
|---|---|
| ***G01S 7/52*** | (2006.01) |
| ***G01N 29/26*** | (2006.01) |
| ***G01N 29/30*** | (2006.01) |
| ***G01N 29/44*** | (2006.01) |

(52) U.S. Cl.

CPC ........... *G01N 29/262* (2013.01); *G01N 29/30* (2013.01); *G01N 29/44* (2013.01); *G01N 2291/044* (2013.01); *G01S 7/52046* (2013.01); *G01S 7/52079* (2013.01); *G01S 7/52085* (2013.01)

(58) Field of Classification Search

CPC ...... G01N 29/262; G01N 29/30; G01N 29/44; G01N 2291/044; G01N 29/069; G01N 29/24; G01N 29/28; G01S 7/52046; G01S 7/52079; G01S 7/52085; A61B 8/4444; A61B 8/4488

See application file for complete search history.

(56) References Cited

U.S. PATENT DOCUMENTS

| | | | |
|---|---|---|---|
| 5,435,314 | A | 7/1995 | Dias |
| 2004/0024320 | A1 | 2/2004 | Karasawa et al. |

(Continued)

FOREIGN PATENT DOCUMENTS

| | | | |
|---|---|---|---|
| CN | 106680377 | A | 5/2017 |
| EP | 0 098 558 | A2 | 1/1984 |

(Continued)

OTHER PUBLICATIONS

Examination Report under Section 18(3) issued in counterpart Application No. GB1811830.7 dated Jul. 2, 2019 (four (4) pages).

(Continued)

*Primary Examiner* — Daniel Pihulic
(74) *Attorney, Agent, or Firm* — Crowell & Moring LLP

(57) ABSTRACT

There is provided, for example, an ultrasonic probe capable of improving the accuracy of testing of a curved-surface structure. An array sensor (ultrasonic array sensor) includes multiple elements (oscillators) to generate an ultrasonic wave. Water (propagation member) is disposed between the array sensor and steel (test target) to propagate the ultrasonic wave. At least one reflection section reflects the ultrasonic wave reflected and returned from the surface of or the inside of the steel, and causes the ultrasonic wave to fall on any of the elements.

10 Claims, 15 Drawing Sheets

(56) References Cited

U.S. PATENT DOCUMENTS

| | | | | |
|---|---|---|---|---|
| 2014/0043933 | A1* | 2/2014 | Belevich | A61B 8/4488 367/11 |
| 2017/0112476 | A1* | 4/2017 | Belevich | A61B 8/4494 |
| 2019/0072526 | A1* | 3/2019 | Kitazawa | G01N 29/30 |
| 2020/0209195 | A1* | 7/2020 | Kitazawa | G01N 29/0654 |

FOREIGN PATENT DOCUMENTS

| | | | | | |
|---|---|---|---|---|---|
| GB | 2566594 | A | * | 3/2019 | G01N 29/44 |
| JP | 54-139888 | U | | 9/1979 | |
| JP | 56-37798 | A | | 4/1981 | |
| JP | 62-150158 | A | | 7/1987 | |
| JP | 10-227775 | A | | 8/1998 | |
| JP | 2001-255310 | A | | 9/2001 | |
| JP | 2003-88521 | A | | 3/2003 | |
| JP | 2004-101422 | A | | 4/2004 | |
| JP | 2010-38820 | A | | 2/2010 | |
| JP | 2011-247649 | A | | 12/2011 | |
| JP | 2012-255653 | A | | 12/2012 | |
| JP | 2019045317 | A | * | 3/2019 | G01N 29/30 |
| WO | WO 2012/154954 | A2 | | 11/2012 | |

OTHER PUBLICATIONS

English-language Office Action issued in counterpart British Application No. GB1811830.7 dated Jan. 15, 2019 (eight (8) pages).

English translation of Notice of Reasons for Refusal issued in Japanese Application No. 2017-168873 dated Jan. 5, 2021 (five (5) pages).

* cited by examiner

FIG. 2

RECEPTION ELEMENT NUMBER n

TRANSMISSION ELEMENT NUMBER m

| | 1 | 2 | 3 | 4 |
|---|---|---|---|---|
| 1 | $W_{11}$ | $W_{12}$ | $W_{13}$ | $W_{14}$ |
| 2 | $W_{21}$ | $W_{22}$ | $W_{23}$ | $W_{24}$ |
| 3 | $W_{31}$ | $W_{32}$ | $W_{33}$ | $W_{34}$ |
| 4 | $W_{41}$ | $W_{42}$ | $W_{43}$ | $W_{44}$ |

FIG. 12

RECEPTION ELEMENT NUMBER

TRANSMISSION ELEMENT NUMBER

| | L4 (4) | L3 (3) | L2 (2) | L1 (1) | 1 | 2 | 3 | 4 | R1 (4) | R2 (3) | R3 (2) | R4 (1) |
|---|---|---|---|---|---|---|---|---|---|---|---|---|
| L4 (4) | $W_{44}$ | $W_{43}$ | $W_{42}$ | $W_{41}$ | $W_{41}$ | $W_{42}$ | $W_{43}$ | $W_{44}$ | $W_{44}$ | $W_{43}$ | $W_{42}$ | $W_{41}$ |
| L3 (3) | $W_{34}$ | $W_{33}$ | $W_{32}$ | $W_{31}$ | $W_{31}$ | $W_{32}$ | $W_{33}$ | $W_{34}$ | $W_{34}$ | $W_{33}$ | $W_{32}$ | $W_{31}$ |
| L2 (2) | $W_{24}$ | $W_{23}$ | $W_{22}$ | $W_{21}$ | $W_{21}$ | $W_{22}$ | $W_{23}$ | $W_{24}$ | $W_{24}$ | $W_{23}$ | $W_{22}$ | $W_{21}$ |
| L1 (1) | $W_{14}$ | $W_{13}$ | $W_{12}$ | $W_{11}$ | $W_{11}$ | $W_{12}$ | $W_{13}$ | $W_{14}$ | $W_{14}$ | $W_{13}$ | $W_{12}$ | $W_{11}$ |
| 1 | $W_{14}$ | $W_{13}$ | $W_{12}$ | $W_{11}$ | $W_{11}$ | $W_{12}$ | $W_{13}$ | $W_{14}$ | $W_{14}$ | $W_{13}$ | $W_{12}$ | $W_{11}$ |
| 2 | $W_{24}$ | $W_{23}$ | $W_{22}$ | $W_{21}$ | $W_{21}$ | $W_{22}$ | $W_{23}$ | $W_{24}$ | $W_{24}$ | $W_{23}$ | $W_{22}$ | $W_{21}$ |
| 3 | $W_{34}$ | $W_{33}$ | $W_{32}$ | $W_{31}$ | $W_{31}$ | $W_{32}$ | $W_{33}$ | $W_{34}$ | $W_{34}$ | $W_{33}$ | $W_{32}$ | $W_{31}$ |
| 4 | $W_{44}$ | $W_{43}$ | $W_{42}$ | $W_{41}$ | $W_{41}$ | $W_{42}$ | $W_{43}$ | $W_{44}$ | $W_{44}$ | $W_{43}$ | $W_{42}$ | $W_{41}$ |
| R1 (4) | $W_{44}$ | $W_{43}$ | $W_{42}$ | $W_{41}$ | $W_{41}$ | $W_{42}$ | $W_{43}$ | $W_{44}$ | $W_{44}$ | $W_{43}$ | $W_{42}$ | $W_{41}$ |
| R2 (3) | $W_{34}$ | $W_{33}$ | $W_{32}$ | $W_{31}$ | $W_{31}$ | $W_{32}$ | $W_{33}$ | $W_{34}$ | $W_{34}$ | $W_{33}$ | $W_{32}$ | $W_{31}$ |
| R3 (2) | $W_{24}$ | $W_{23}$ | $W_{22}$ | $W_{21}$ | $W_{21}$ | $W_{22}$ | $W_{23}$ | $W_{24}$ | $W_{24}$ | $W_{23}$ | $W_{22}$ | $W_{21}$ |
| R4 (1) | $W_{44}$ | $W_{43}$ | $W_{42}$ | $W_{41}$ | $W_{41}$ | $W_{42}$ | $W_{43}$ | $W_{44}$ | $W_{44}$ | $W_{43}$ | $W_{42}$ | $W_{41}$ |

ULTRASONIC PROBE, ULTRASONIC FLAW DETECTION APPARATUS AND METHOD

BACKGROUND

The present invention relates to an ultrasonic probe, an ultrasonic flaw detection apparatus, and a method.

Ultrasonic testing (UT) is a typical nondestructive testing method used in a nuclear power plant. At present, in addition to a method of evaluating a flaw with a waveform called an A scope, a phased array (PA) method is used as a main technique for UT. The PAmethod is a technique of controlling the phases of ultrasonic waves generated from elements of an array sensor in order to scan, in a desired direction, an ultrasonic beam, which is a wave obtained by synthesizing the ultrasonic waves generated from the elements of the array sensor, or vary a focal point. Further, the PA method makes it possible to evaluate a test result while viewing an image. Therefore, the PA method has significantly contributed to increasing the speed and accuracy of testing. However, if the drive timing (delay time) of the elements of the array sensor is not properly controlled, correct test results are not obtained. Therefore, when a test target has a complicated shape or an ultrasonic wave is transmitted through media, delay time setup is complicated. Consequently, the application of the PA method has often become difficult.

Meanwhile, a full matrix capture (FMC) method is highlighted in recent years as a new ultrasonic testing method. The FMC method is a technique of acquiring a high-definition image by individually recording all waveforms corresponding to transmission/reception combinations of the elements of the array sensor and performing an appropriate software-based waveform synthesis process. The FMC method eliminates the necessity of exercising phase control during data recording. Once the waveforms are recorded, the FMC method makes it possible to generate an image off-line after changing phase matching conditions as desired. The FMC method is also able to reproduce a PA-method-based image by synthesizing waveforms in consideration of delay time.

The PA method controls the phases of ultrasonic waves generated from the elements of the array sensor (hereinafter referred to as the elementary waves) in order to vary the direction and focal point of an ultrasonic beam, which is a wave obtained by synthesizing the elementary waves, in accordance with a test target region. Ultrasonic waves reflected, for example, from a flaw are received again by the elements of the array sensor, converted to digital signals, and added up in consideration of delay time by a computation section such as a field-programmable gate array (FPGA) in an apparatus. In this case, the delay time should be set based on the Huygens' principle so that the phases of the elementary waves are aligned to form a single envelope. However, if the linearity of waves is presumed, a focused beam is to be generated without generating a synthesized wave through an electrical circuit switching process as far as the elementary waves generated from a single oscillating element are later superimposed on each other. The FMC method, which is developed based on the above, stores, in a memory, waveforms obtained from all combinations of oscillating elements and generates a flaw detection image by synthesizing the waveforms in a subsequent software process. Pixel values of a flaw image are obtained when the amplitudes of time corresponding to path lengths between transmission/reception elements and pixels are superimposed on each other with respect to all elementary waves. Although some image generation algorithms based on different processes are proposed, they are similar to each other in basic principles. Substantially equivalent images are obtained when the proposed algorithms are used. A synthetic aperture focusing technique (SAFT) and a total focusing method (TFM) are typical methods based on the proposed algorithms. The present invention will be described on the assumption that the TFM is used as an image generation algorithm. The synthetic aperture focusing and other similar image generation algorithms are also applicable to the present invention. The FMC method is definitely a waveform data recording method and should be differentiated from the SAFT and TFM. However, the following description of the present invention assumes for the sake of simplicity that a method adopted for both recording and image generation processes is referred to as the FMC method.

The FMC method has some advantages. Typically, the FMC method is advantageous in that it is suitable for flaw detection of a curved object. That is to say, even if a test subject on which an ultrasonic wave is to fall has a curved surface, the FMC method is able to generate a flaw detection image more easily than the PA method. In general, when a flexible array sensor is used to detect a flaw from a curved surface with an ultrasonic wave incident on the curved surface, the array sensor is brought into close contact with the test subject or the test subject and the array sensor are both immersed in water to cause an ultrasonic wave to fall on the inside of the test subject by using the water as a mediator (this method is hereinafter referred to as the water immersion method). When the water immersion method is used, a linear array sensor having linearly arranged elements is often used. However, a flexible array sensor may also be used in the water immersion method. To generate an image, it is necessary to determine ultrasonic wave propagation paths that join individual elements to calculation points on the image. However, when the water immersion method is used, it is necessary to consider refraction occurring at an interface between the water and the test subject. This requires the relative coordinates of the elements with respect to the test subject and geometric information about the surface shape of the test subject. The geometric information is given in the form of discrete coordinate values or functions. However, if CAD data is available, it may be used. When the propagation paths of all elementary waves are determined in the above manner, an FMC flaw detection image can be generated in consideration of refraction. To accurately determine the relative coordinates of the elements with respect to the test subject, however, it is necessary to use an additional sensor for acquiring position information or mount a sensor on a scanner or other movable mechanical device. This poses a considerable burden in terms of both cost and labor. A method disclosed, for example, in Japanese Unexamined Patent Application Publication No. 2012-255653 addresses the above problems by performing an electronic linear scan without controlling the delay time by using an array sensor, performing an aperture synthesis process based on the result of the electronic linear scan, and extracting the surface shape from a pixel distribution having the resulting value representing the maximum image brightness. Meanwhile, a method disclosed in Japanese Unexamined Patent Application Publication No. 2011-247649 extracts a surface echo from a waveform derived from the phased array method and estimates the surface shape by using tangent lines of circles having radiuses equivalent to beam path lengths between oscillators and the surface of the test subject.

SUMMARY

However, the above-described disclosed methods are obviously at a disadvantage in that they extract only portions existing on the propagation paths through which reflected waves return to the elements, that is, extract only a part of the surface shape. Therefore, if the method disclosed in Japanese Unexamined Patent Application Publication No. 2012-255653 or No. 2011-247649 is used to extract a convex shaped, for example, like excess weld metal, obtained signals relate to only the top of excess weld metal and neighboring flat portions. Consequently, propagation paths for incidence on the inside of the test subject from the lateral surfaces of excess weld metal do not contribute to an image or the image is generated based on wrong propagation paths. This degrades the accuracy of testing.

The present invention provides, for example, an ultrasonic probe that is capable of improving the accuracy of testing of a curved-surface structure.

According to an aspect of the present invention, there is provided an ultrasonic probe including an ultrasonic array sensor, a propagation member, and at least one ultrasonic reflection member. The ultrasonic array sensor includes oscillators and generates an ultrasonic wave. The propagation member is disposed between the ultrasonic array sensor and a test target in order to propagate the ultrasonic wave. The ultrasonic reflection member reflects the ultrasonic wave that bounces back from the surface or inside of the test target, and causes the ultrasonic wave to fall on one of the oscillators.

The present invention improves the accuracy of testing of a curved-surface structure. The other problems, configurations, and advantageous effects will become apparent from the following description of embodiments.

BRIEF DESCRIPTION OF THE DRAWINGS

Embodiments of the present invention will be described in detail based on the following figures, in which:

FIG. 2 is a diagram illustrating elementary waves corresponding to combinations of transmission and reception elements;

FIG. 12 is a diagram presenting a list of elementary waves that are used for imaging by an ultrasonic flaw detection apparatus having the ultrasonic probe according to the first embodiment;

DETAILED DESCRIPTION

Configurations and operations of an ultrasonic flaw detection apparatus including an ultrasonic probe according to first to fourth embodiments of the present invention will now be described with reference to the accompanying drawings.

First Embodiment

The following first describes the procedures for recording a waveform by the FMC method according to the present invention and generating an image by suing the recorded waveform.

Figure 1:
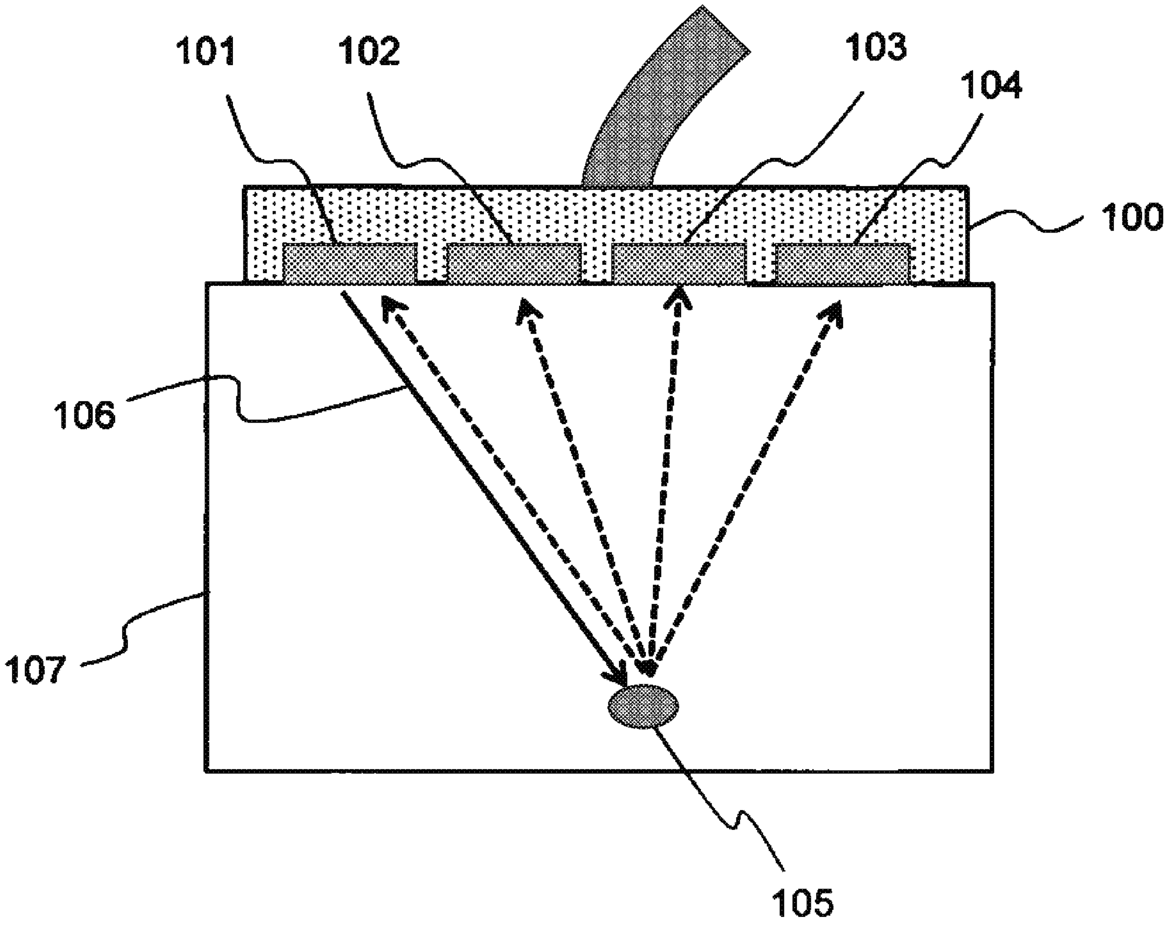
FIG. 1 is a diagram illustrating the principle of waveform recording by the FMC method.

FIG. 1 illustrates the principle of waveform recording by the FMC method. It is assumed for ease of explanation that the total number of elements of a sensor is four. The principle remains unchanged even if the number of elements is increased. Waveform signal recording is started by exciting only a first element (element 101) in an array sensor 100 so that an ultrasonic wave is incident. The ultrasonic wave 106 propagated in a test subject 107 is reflected or scattered from a flaw or other reflection source 105, returned toward the elements, and received by the first and other elements (elements 101, 102, 103, 104).

The received wave may be recorded on an individual element basis. An alternative is to store signals simultaneously received by the elements 101-104 in a hardware memory and sequentially read the stored signals by switching through, for example, a multiplexer. The order in which the elements are switched over is not restricted. The elements may be randomly switched over. The received wave is converted to an electrical signal and stored in the hardware memory as elementary waves $W_{11}$, $W_{12}$, $W_{13}$, $W_{14}$. Similarly, a second element (element 102) is excited, and the resulting reflected wave is received by the first to fourth elements (elements 101, 102, 103, 104).

When recording is repeated while the element to be excited is sequentially changed in the above manner, elementary waves $W_{mn}$ (m, n=1, 2, 3, 4) corresponding to all combinations of transmission and reception elements can be obtained as depicted in FIG. 2. If the total number of array sensor elements is N, there are $N^2$ patterns of combinations. In theory, the equation $W_{mn}=W_{nm}$ (m, n=1, 2, . . . , N) is established due to reciprocity of wave motion. Therefore, all elementary waves need not be recorded, and $(N^2+N)/2$ patterns of combinations will do. In reality, however, reciprocity is not perfectly established in most cases because of circuit and element characteristics. Consequently, the present invention will be described on the assumption that all patterns of elementary waves are to be recorded. In some cases where, for example, a propagation path oriented at a specific angle is to be used or waveform signals of faulty elements are to be excluded, certain elementary waves may be selectively used as needed for imaging.

Figure 3A:
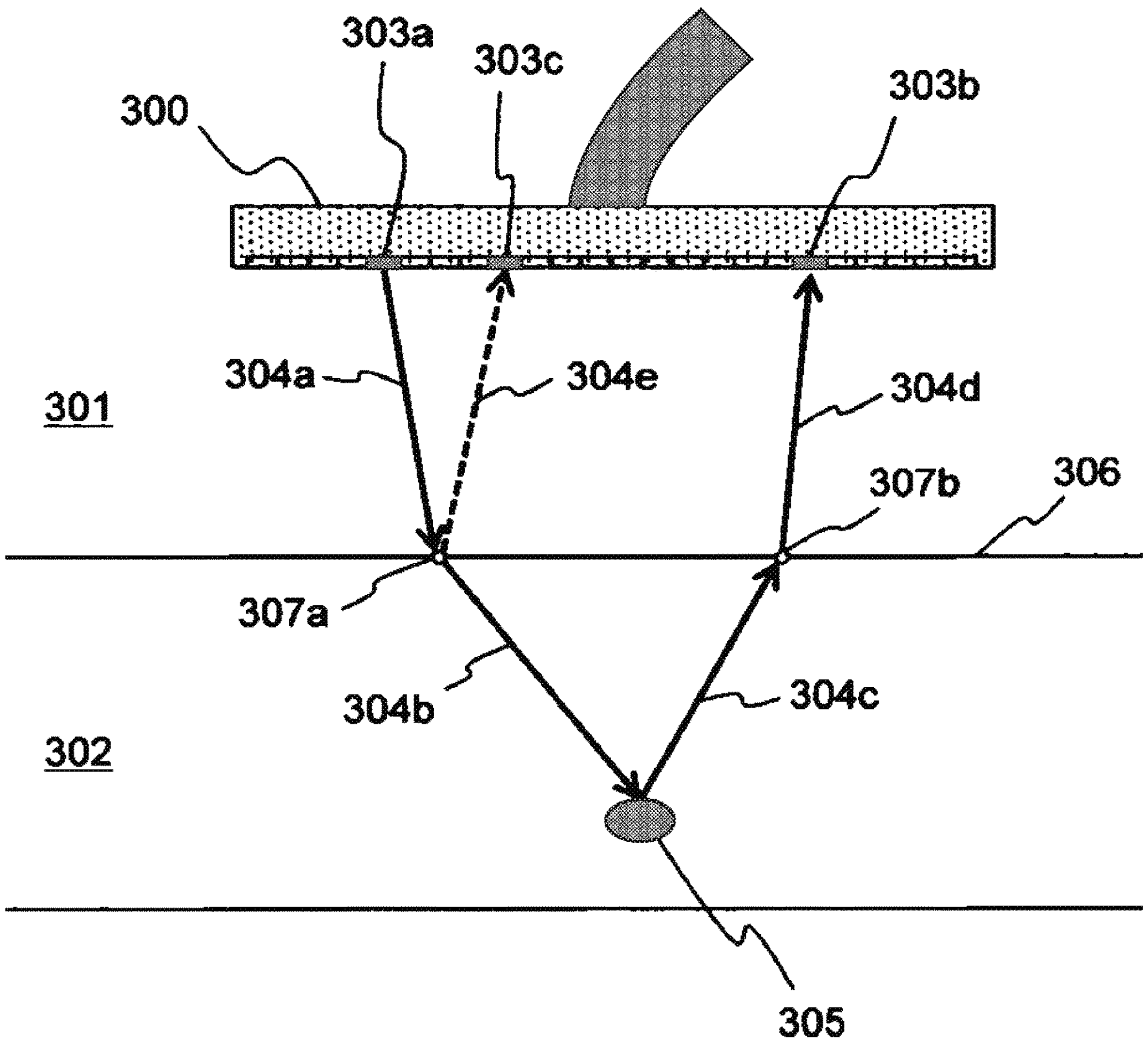
FIG. 3A is a diagram illustrating the behavior of an ultrasonic wave.

A method of generating a flaw detection image from the above-mentioned elementary waves will now be described with reference to FIG. 3A. For the sake of simplicity, the following description assumes that there are two propagation substances. The same idea applies even if there are more than two propagation substances. Further, for ease of explanation, the following description assumes that water and steel are used as the propagation substances. In FIG. 3A, a propagation substance 301 is water, and a propagation substance 302 is steel. It is obvious that the same idea applies even if some other propagation substances are used.

For example, an ultrasonic wave starting from an element 303*a* of an array sensor 300 is rectilinearly transmitted along a propagation path 304*a* in water 301. A portion of the ultrasonic wave is then reflected at a point 307*a* on an interface 306 between the water 301 and the steel 302, and some other portion of the ultrasonic wave is oriented at a refraction angle satisfying the Snell's law and proceeds into the steel 302 along a propagation path 304*b*. If it is assumed here that a reflection source 305 is, for example, in the steel 302, the ultrasonic wave is reflected from the reflection source 305, proceeds along a propagation path 304*c*, and returns to the interface 306. Further, the ultrasonic wave is refracted at a point 307*b* on the interface 306 in such a manner as to satisfy the Snell's law, proceeds along a propagation path 304*d* in the water 301, and is eventually received by an element 303*b*.

When the coordinates of the element 303*a* are (xm, zm), the coordinates of the reflection source 305 are (xi, zi), and the coordinates of the point 307*a* on the interface are (xb1, zb1), the time of propagation τmi from the element 303*a* to the reflection source 305 is given by the equation below.

$$\tau_{mi} = \frac{\sqrt{(x_{b1} - x_m)^2 + (z_{b1} - z_m)^2}}{c_1} + \frac{\sqrt{(x_i - x_{b1})^2 + (z_i - z_{b1})^2}}{c_2} \quad (1)$$

where c1 and c2 are the speeds of sound of water 301 and steel 302, respectively.

The time of propagation τni from the reflection source 305 to the element 303*b* can be determined based on the same idea. Thus, the time of propagation from the element 303*a* to the element 303*b* is given by the equation τmi+τni. This also holds true for combinations of the other transmission and reception elements. No matter whether there are actual reflection sources, the aperture synthesis process and the TFM generate an image on the assumption that all pixels are reflection sources. Therefore, the reflection source 305 may be regarded as a pixel. Consequently, when all elementary waves are added together at the pixel, a pixel value Si is given by the equation below.

$$S_i = \sum_{m=0}^{N-1} \sum_{n=0}^{N-1} W_{mn}(\tau_{mi} + \tau_{ni}) \quad (2)$$

where N is the number of elements of the array sensor 300.

The elementary waves include not only reflected signals resulting from the reflection source 305 in the steel 302, but also those reflected from the interface 306. As mentioned earlier, the ultrasonic wave transmitted from the element 303*a* propagates rectilinearly along the propagation path 304*a* in the water 301, partly bounces off the point 307*a* on the interface 306, and proceeds along a propagation path 304*e* until it is received by an element 303*c*. An ultrasonic wave transmitted from an element other than the element 303*a* is also partly reflected from the interface 306 (boundary) and received by a certain element except when it is outside an element array region of the array sensor 300.

Figure 3B:
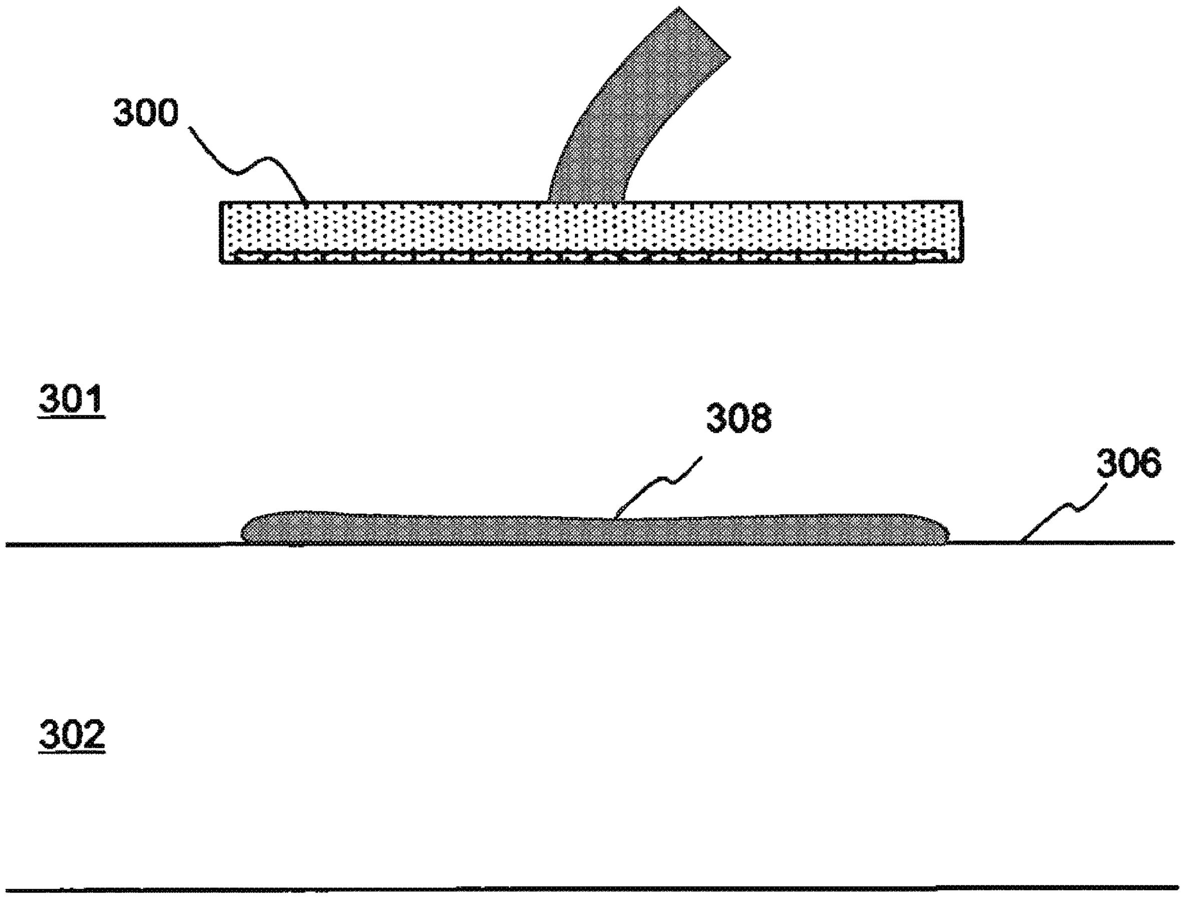
FIG. 3B is a diagram illustrating a linear surface echo acquired from a test subject depicted in FIG. 3A.

Consequently, a linear surface echo 308 depicted in FIG. 3B is formed in the vicinity of the interface 306 between the imaged water 301 and steel 302. Analyzing the position of the surface echo 308 makes it easy to determine the relative distance and angle between the array sensor 300 and the steel 302.

A case where a weld zone or other subject having a convex surface is the test subject will now be described with reference to FIG. 4. In this case, too, for ease of explanation, the following description assumes that water and steel are used as the propagation substances. That is to say, in FIG. 4, a propagation substance 401 is water, and a propagation substance 402 is steel. It is obvious that the same idea applies even if some other propagation substances are used.

First of all, the behavior of an ultrasonic wave propagated to the vicinity of the top of a convex 405 on the surface of the test subject will be described. Here, it is assumed, for example, that the ultrasonic wave transmitted from an element 403*a* of an array sensor 400 propagates rectilinearly along a propagation path 404*a* and reaches the convex 405. The ultrasonic wave is partly reflected from the convex 405, partly refracted at a point 407*a* on the boundary, and propagated to the inside of the steel 402. In this instance, the angle of reflection and the angle of refraction are such that the angle of incidence and the angle of reflection or the angle of refraction satisfy the Snell's law with respect to a normal line at the point 407*a* on the convex. The ultrasonic wave propagated along a propagation path 404*b* is reflected from a reflection source 408, refracted again at the boundary, and received by an element of the array sensor 400, such as an element 403*c*.

Figure 4:
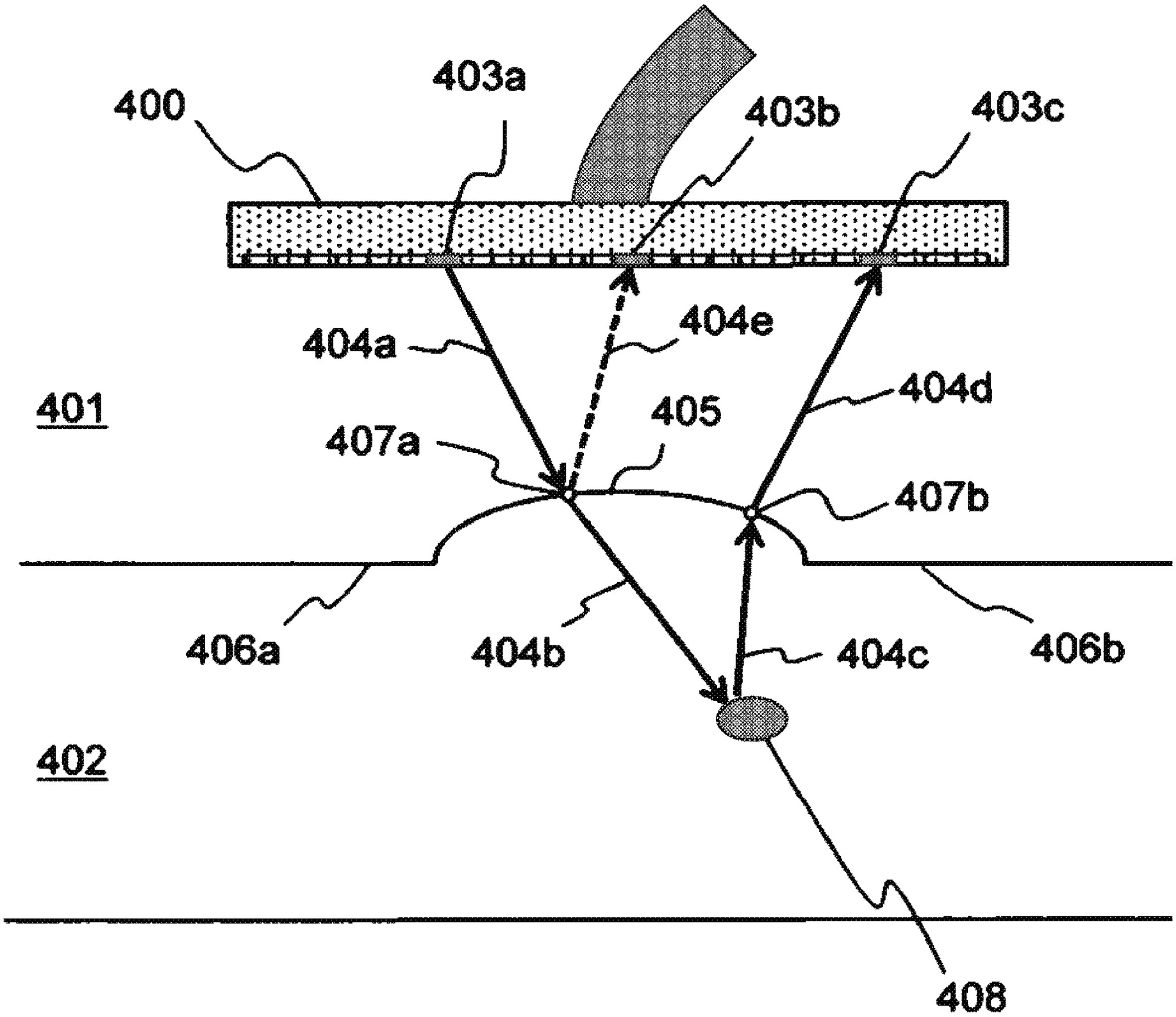
FIG. 4 is a diagram illustrating the behavior of an ultrasonic wave in a test subject having a convex.

FIG. 4 indicates that the ultrasonic wave reflected from the reflection source 408 propagates again through a point 407*b* on the boundary between the convex 405 and the water 401 and returns to the array sensor 400. However, it is also conceivable that the ultrasonic wave may return to the array sensor, for example, through a flat portion 406*b* of the boundary. Further, the ultrasonic wave transmitted from the element 403*a* is partly reflected from the point 407*a* on the convex 405 and received by an element 403*b*. Propagation paths for reflection and refraction through flat portions 406*a*, 406*b* other than the convex are the same as described with reference to FIGS. 3A and 3B.

The behavior of an ultrasonic wave propagated to the vicinity of an end of the convex 405 on the test subject surface will now be described with reference to FIG. 5. Here, it is assumed that the ultrasonic wave transmitted from an element 501 propagates through the water 401 and reaches the vicinity of an end of the convex 405 on the test subject surface, for example, a point 503*a*. The ultrasonic wave is partly reflected from the point 503*a* and partly refracted and propagated into the steel 402. The ultrasonic wave refracted at the point 503*a* and propagated into the steel 402 is reflected from a reflection source 504 and returned toward the interface. In such an instance, the ultrasonic wave partly reaches an element surface as depicted in FIG. 4 and partly propagates to the outside of the element surface along propagation paths 502*c*, 502*d* depicted in FIG. 5.

Figure 5:
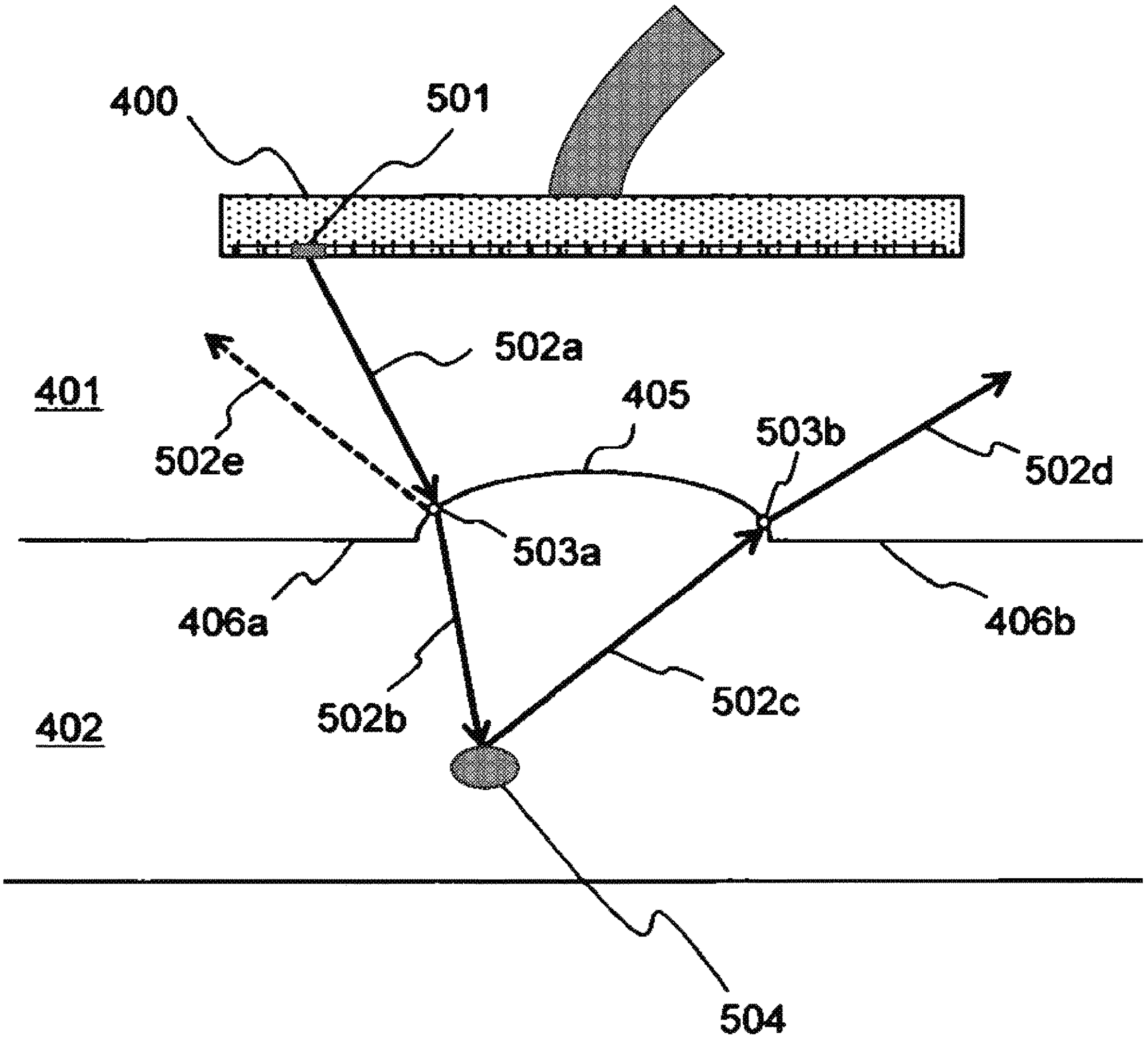
FIG. 5 is a diagram illustrating the behavior of an ultrasonic wave in the vicinity of the convex of the test subject depicted in FIG. 4.

FIG. 5 depicts, as an example, only a path for propagation to the outside of the element surface. As a waveform signal resulting from such propagation is not recorded as an elementary wave, information about a reflection source is lost. Meanwhile, as regards the ultrasonic wave reflected from the point 503*a*, a tangent line in the vicinity of an end of the convex has a great gradient for the element surface of the array sensor 400. Therefore, the ultrasonic wave propagates toward the outside of the element surface of the array sensor 400, for example, along a propagation path 502*e*. This results in the loss of information about surface reflection from a relevant part.

Figure 6:
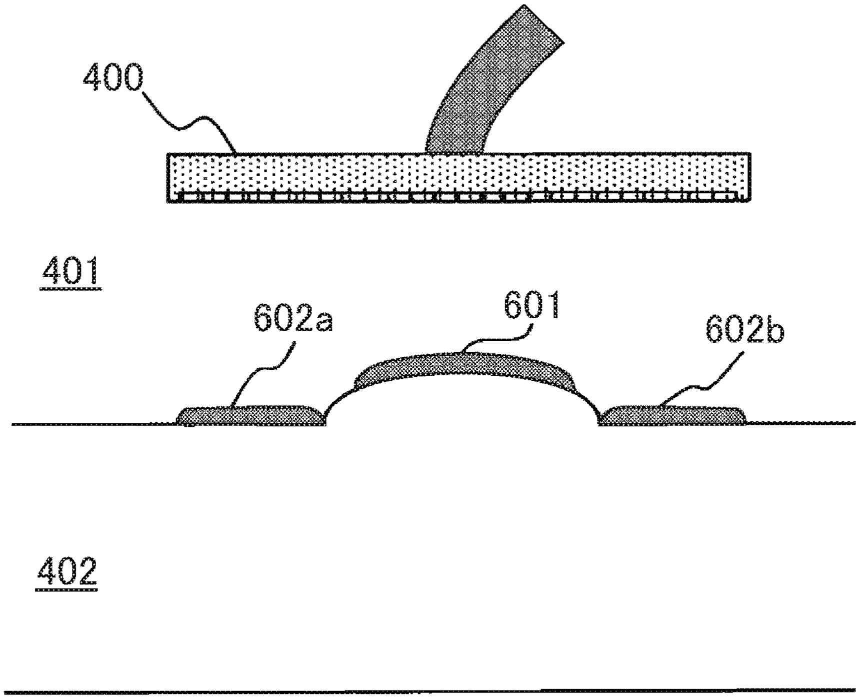
FIG. 6 is a diagram illustrating a surface echo acquired from the test subject depicted in FIG. 4.

Consequently, in the vicinity of the boundary between the imaged water 301 and steel 302, only surface echoes 602*a*, 602*b* from flat portions and a surface echo 601 from the vicinity of the top of the convex are formed as depicted in FIG. 6 so that a surface shape cannot accurately be extracted. Therefore, even if an attempt is made to image the inside of the steel 402 by the TFM or the aperture synthesis method, refracted propagation paths cannot accurately be determined. Thus, distortion may occur to displace a reflection source, such as a flaw, or decrease an echo intensity, thereby adversely affecting test results.

Figure 7:
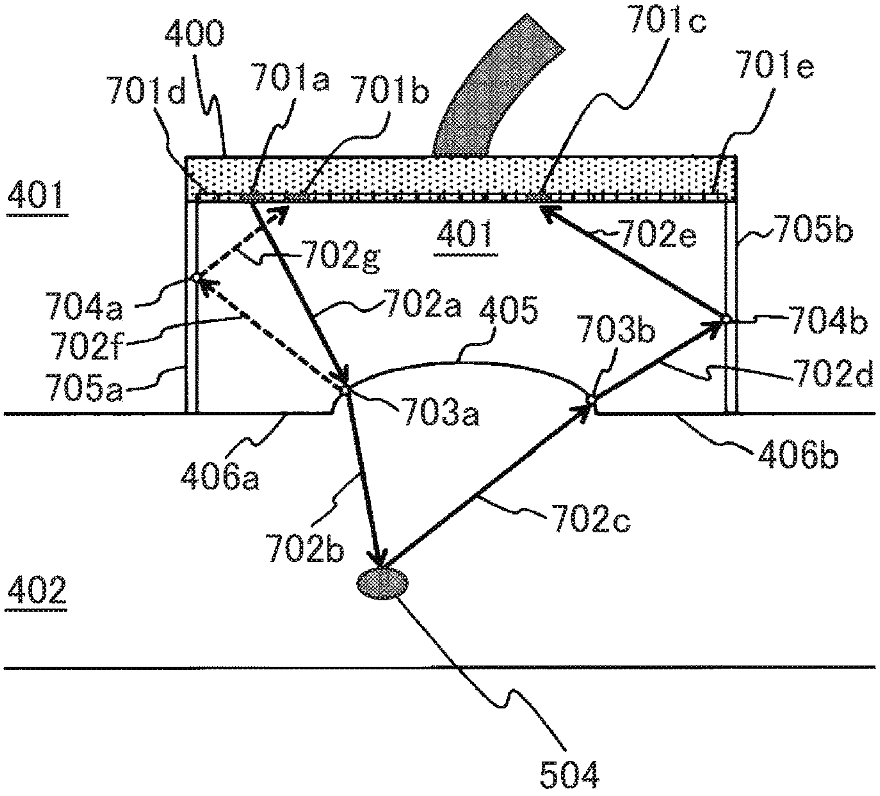
FIG. 7 is a diagram illustrating a configuration of an ultrasonic probe according to a first embodiment of the present invention.

In view of the above circumstances, the first embodiment is configured as depicted in FIG. 7 so that reflection sections 705*a*, 705*b* are disposed between the array sensor and the surface of the steel. This makes it possible to receive, without fail, an ultrasonic wave reflected from the steel surface and propagated to the outside of the scope of the element surface of the array sensor 400 and an ultrasonic wave reflected from a reflection source and propagated to the outside of the scope of the element surface of the array sensor 400.

The above will be explained in detail with reference to FIG. 7. For example, an ultrasonic wave transmitted from an element 701 of the array sensor 400 and reflected from a point 703*a* is propagated along a propagation path 702*f*, reflected toward the element surface from a point 704*a* on the inner surface of the reflection section 705*a*, propagated along a propagation path 702*g*, and received by an element 701*b*. Therefore, if the reflection section 705*a* does not exist, an ultrasonic wave propagated directly to the outside of the scope of the element surface can also be received.

Further, an ultrasonic wave reflected from the reflection source 504 and returned from the steel 402 to the water 401, for example, through propagation paths 702*c*, 702*d* is also reflected, for example, from a point 704*b* on the inner surface of the reflection section 705*b*, propagated along a propagation path 702*e*, and received by an element 701*c*. Therefore, if the reflection section 705*b* does not exist, an ultrasonic wave propagated to the outside of the scope of the element surface can also be received. This makes it possible to acquire an increased amount of information about the reflection source.

Stated differently, the array sensor 400 (ultrasonic array sensor) includes multiple elements (oscillators) and generates an ultrasonic wave. The water 401 (propagation member) is disposed between the array sensor 400 and the steel 402 (test target) to propagate the ultrasonic wave. At least one reflection section 705*a*, 705*b* (ultrasonic reflection member) reflects an ultrasonic wave that is reflected from the surface or inside of the steel 402 and returned, and causes the ultrasonic wave to fall on a certain element.

The reflection sections 705*a*, 705*b* reflect an ultrasonic wave as far as they are formed of a substance that differs in acoustic impedance from a propagation substance. Thus, the reflection sections 705*a*, 705*b* may be formed, for example, of resin or metal. If the propagation substance is the water 401, its acoustic impedance is approximately $1.5\times10^6$ $kg/m^2s$. The greater the difference from this numerical value, the higher the reflectance. Therefore, it is preferable that the reflection sections 705*a*, 705*b* be formed of metal, such as stainless steel. Obviously, however, the reflection sections 705*a*, 705*b* may be formed of metal other than stainless steel.

As reflection occurs at a surface, the influence exerted by the thickness of a plate is small. However, if the plate is excessively thin, a plate wave is generated. When the oscillation of the plate wave propagates through water and reaches an element, it may become a noise source. Therefore, it is preferable that the plate thickness be several millimeters or greater.

It is preferable that the reflection sections 705*a*, 705*b* be planar and perpendicular to the element surface. The reason is that the use of such reflection sections makes it easy to calculate a propagation path (e.g., propagation path 702*g*) at the time of imaging. That is to say, the reflection sections 705*a*, 705*b* (ultrasonic reflection members) have a flat surface perpendicular to a plane on which the elements (oscillators) of the array sensor 400 are disposed, and reflect an ultrasonic wave from the flat surface.

However, the reflection sections 705*a*, 705*b* need not always be shaped like a plate although the use of reflection sections other than plate-like reflection sections complicates the calculation of propagation paths. Even if the reflection sections have a curved surface, the same advantageous effects can be obtained as far as the propagation paths can be calculated.

Figure 10:
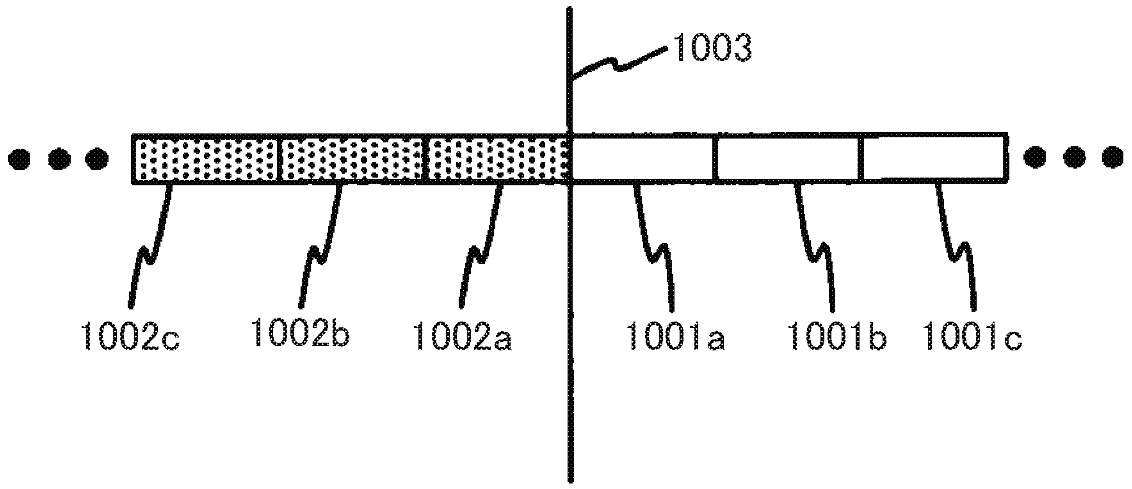
FIG. 10 is a diagram illustrating exemplary positions at which reflection sections are disposed.

The reflection sections should preferably be disposed so that an end face 1003 of an endmost element 1001*a* coincides with the inner surface of the reflection section 705*a* as depicted in FIG. 10. The reflection section 705*b* is based on exactly the same idea, and should preferably be disposed so that its inner surface coincides with an element end face. That is to say, there are two reflection sections (ultrasonic reflection members), and the reflection sections 705*a*, 705*b* are disposed at opposing ends of an array of elements (oscillators) of the array sensor 400.

Figure 8:
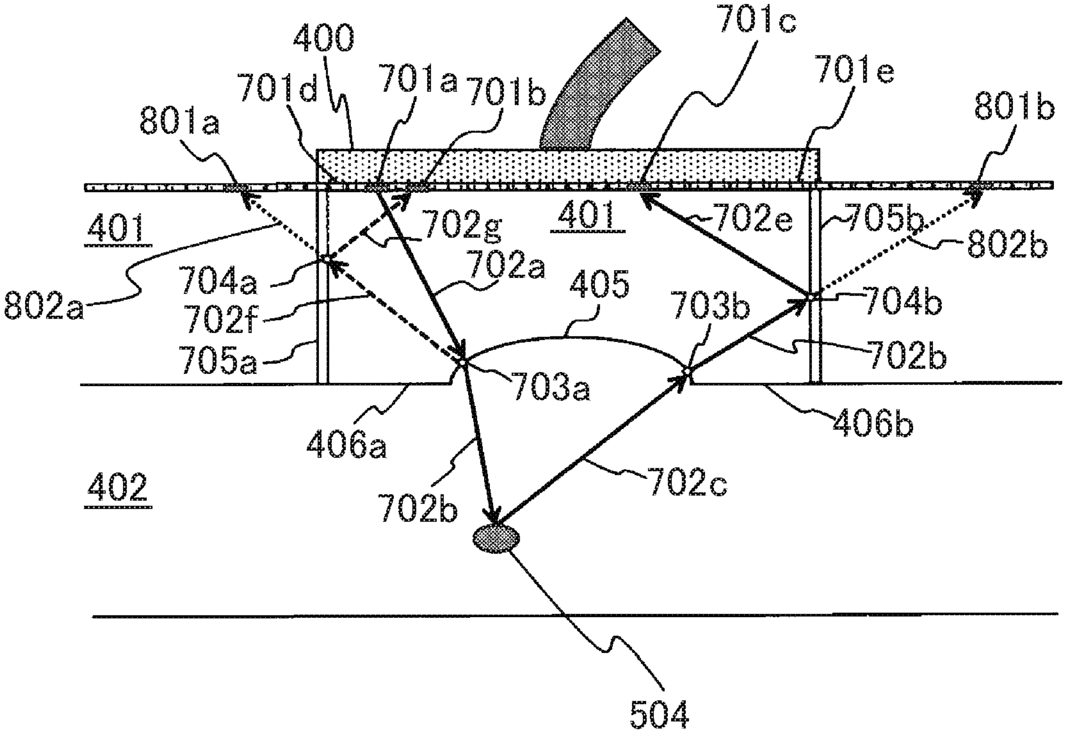
FIG. 8 is a diagram illustrating virtual elements.

The reason is that image generation can be accomplished without making substantial changes to a program as far as processing is performed for imaging by the TFM or the aperture synthesis method with the reflection sections disposed as described above on the assumption that the elements virtually exist at positions symmetrical with respect to the end face 1003 as depicted in FIG. 8.

For example, as regards the propagation path 702*g*, processing may be performed on the assumption that an ultrasonic wave is propagated along a propagation path 802*a* and received by a virtual element 801*a*. This also holds true for the propagation path 702*e*. That is to say, as regards the propagation path 702*e*, processing may be performed on the assumption that an ultrasonic wave is looped back symmetrically with respect to the inner surface of the reflection section 705*b*, propagated along a propagation path 802*b*, and received by a virtual element 801*b*. FIG. 12 lists elementary waves that are used for imaging in the above case.

Figure 11:
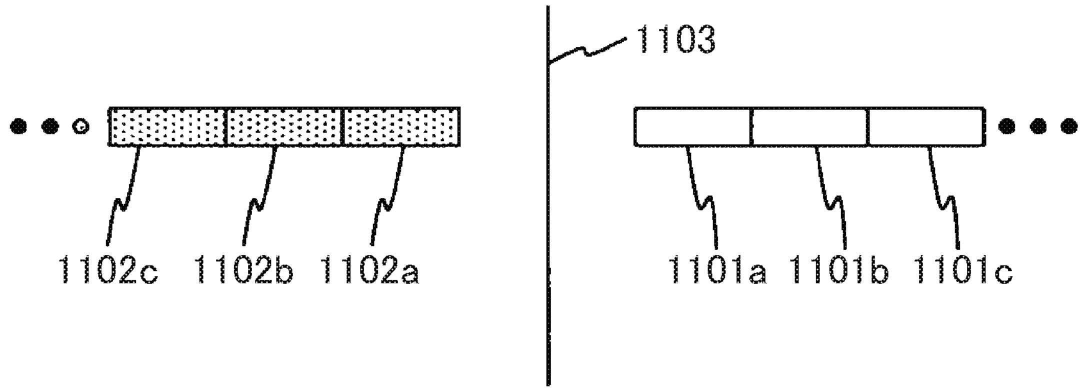
FIG. 11 is a diagram illustrating other exemplary positions at which the reflection sections are disposed.

Only sixteen elementary waves listed at the center and enclosed by a thick outline are actually recorded. However, when the virtual elements are taken into consideration, FIG. 12 indicates that the amount of information available for imaging is increased nine-fold. A portion outside the thick outline represents information that was formerly discarded. The virtual elements should be positioned symmetrically with respect to an end face 1103 as depicted in FIG. 11. There may be a gap between the elements and the end face 1103. In this case, an ultrasonic wave arriving at the gap is not received. However, a greater amount of information is acquired than in a case where no virtual elements are taken into consideration.

Further, when reflection occurs at the reflection sections, mode conversion may occur to newly generate a longitudinal wave and a transverse wave and cause a false echo. However, the false echo can be avoided to a certain extent by imposing a restriction such that when, for example, a longitudinal-wave critical angle is exceeded by the angle of incidence on the reflection sections, the resulting elementary waves are not to be used for generating an image with a longitudinal wave.

Figure 9:
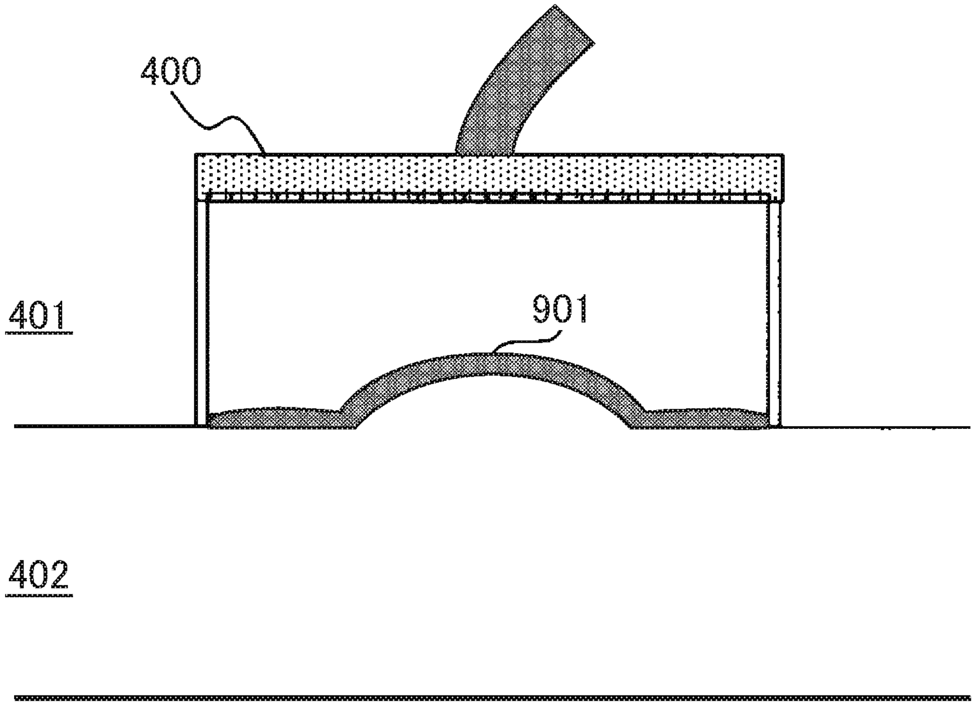
FIG. 9 is a diagram illustrating a surface echo that is acquired from a test subject having a convex by using the ultrasonic probe according to the first embodiment.

When the reflection sections are disposed as descried above, a surface echo 901 is formed in the vicinity of the boundary between the imaged water 301 and steel 302 and positioned over not only the flat portions and the vicinity of the top of the convex but also the vicinity of an end of the convex as depicted in FIG. 9. Therefore, the surface shape can be accurately extracted. Consequently, refracted propagation paths can be accurately determined when the inside of the steel 402 is to be imaged by the TFM or the aperture synthesis method. This makes it possible to generate an undistorted image, prevent flaws and other reflection sources from being displaced and the echo intensity from being lowered, and provide an ultrasonic flaw detection method capable of accurately and easily performing nondestructive testing on a flaw in a curved-surface structure. That is to say, the present embodiment improves the accuracy of testing of a curved-surface structure.

Figure 16:
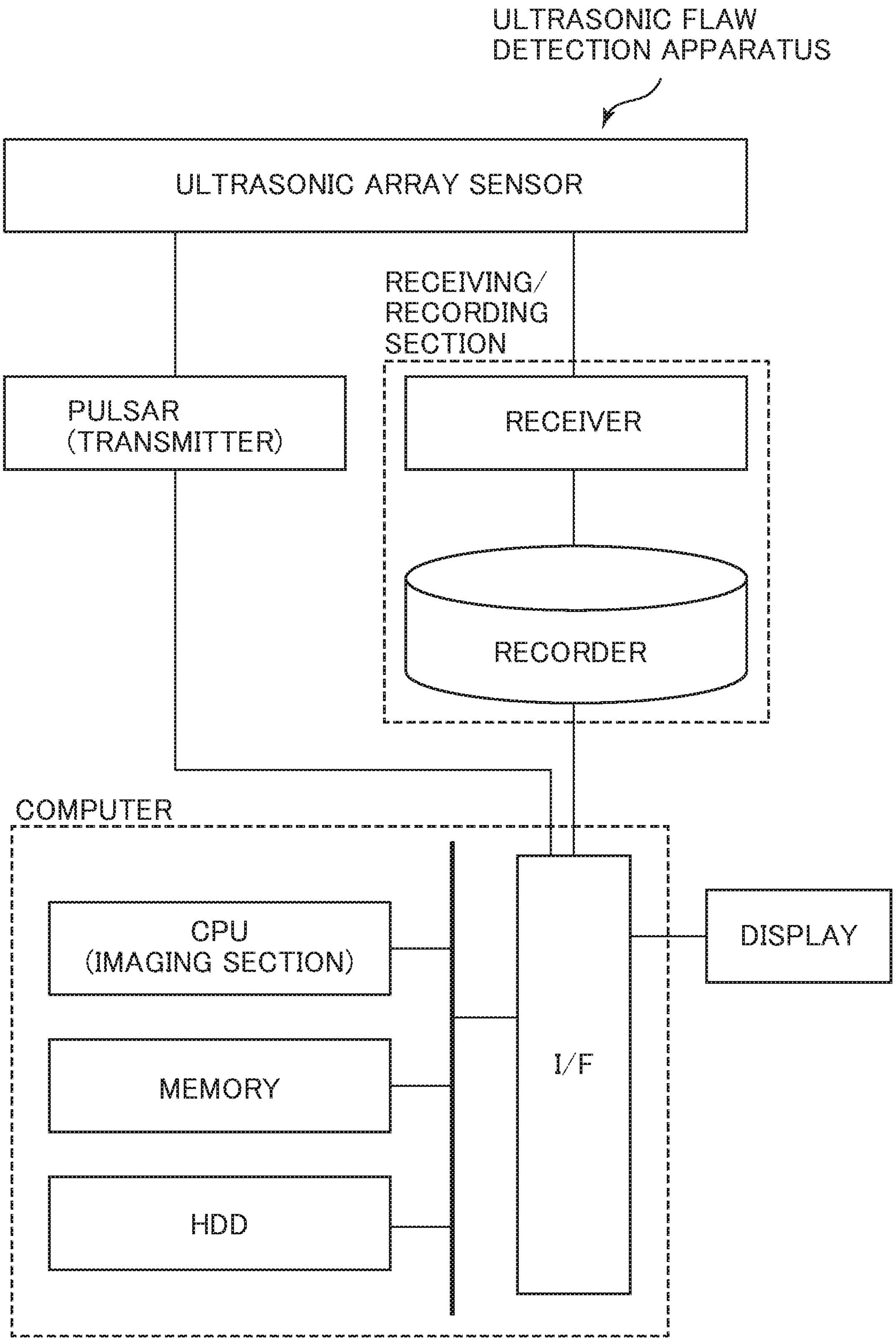
FIG. 16 is a diagram illustrating a configuration of the ultrasonic flaw detection apparatus.

As illustrated in FIG. 16, the ultrasonic flaw detection apparatus includes, for example, an ultrasonic array sensor, a pulsar, a receiver, a recorder, a computer, and a display. The computer includes, for example, a central processing unit (CPU) or other processor, a memory, a hard disk drive (HDD), and an interface (I/F).

Figure 17:
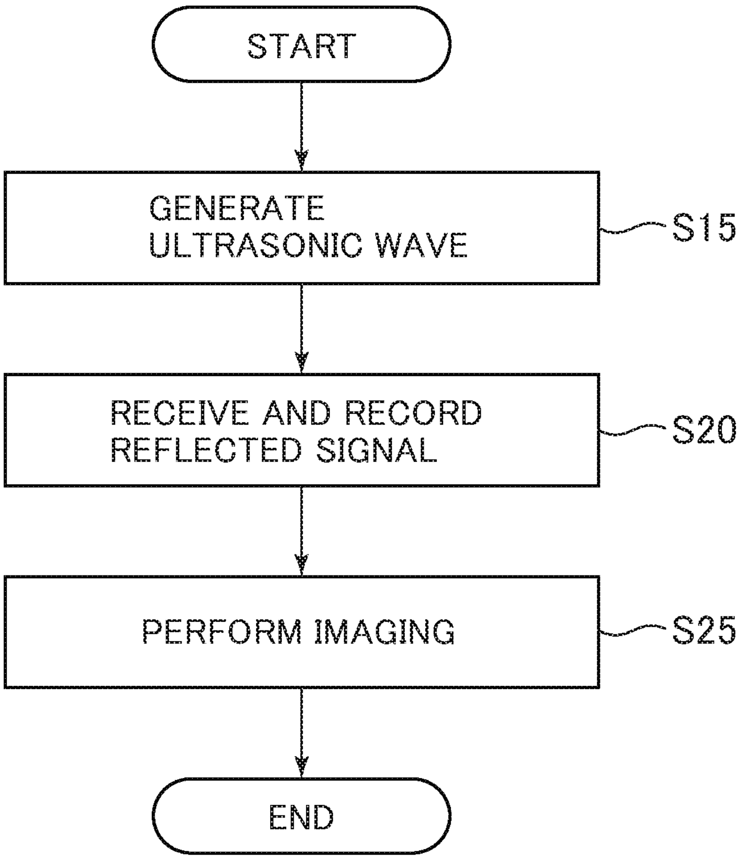
FIG. 17 is an exemplary flowchart illustrating the ultrasonic flaw detection apparatus.

FIG. 17 is an exemplary flowchart illustrating the ultrasonic flaw detection apparatus. The pulsar (transmitter) generates an ultrasonic wave from each element of the ultrasonic array sensor in accordance with a command from the CPU (step S15). The receiver receives a signal that is reflected from a test target and received by each element, and then records the received signal in the recorder (step S20). In this instance, the receiver and the recorder function as a receiving/recording section. The CPU (imaging section) in the computer images the reflected signal recorded in the recorder by the aperture synthesis method, the total focusing method, or other similar method (step S25).

More specifically, the CPU (processor) in the computer generates an image of the test target in accordance with an ultrasonic wave that is reflected and returned from the surface or inside of the test target and incident on the elements (oscillators) of the ultrasonic array sensor through the reflection sections 705*a*, 705*b* (ultrasonic reflection members) and with an ultrasonic wave that is reflected and returned from the surface or inside of the test target and incident on the elements without passing the reflection sections 705*a*, 705*b*. The CPU displays the image of the test target on the display.

Second Embodiment

Figure 13A:
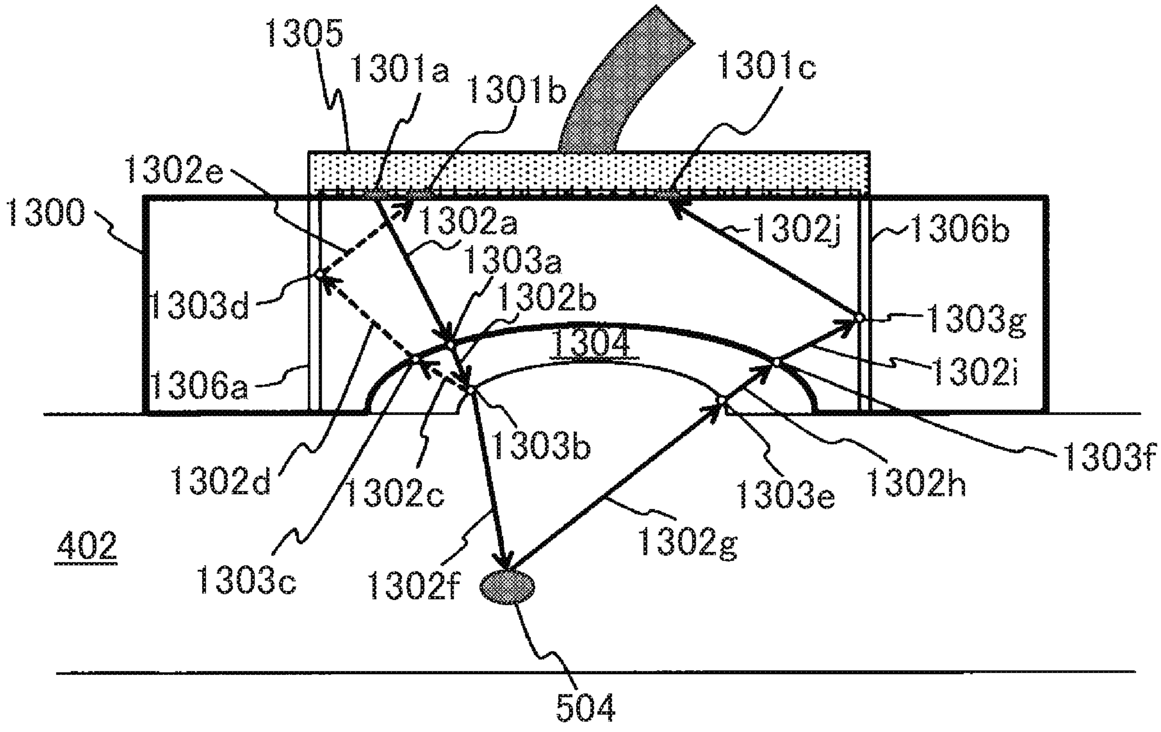
FIG. 13A is a diagram illustrating a configuration of the ultrasonic probe according to a second embodiment of the present invention.

A second embodiment of the present invention will now be described with reference to FIG. 13A. The second embodiment is configured so that an ultrasonic wave emitted from the elements of an array sensor 1305 is incident on a test subject 402 through a wedge 1300 (shoe) and a propagation substance 1304. As is the case with the first embodiment, the test subject 402 is steel having a convex shaped, for example, like excess weld metal. The wedge 1300 functions as a propagation member for propagating an ultrasonic wave. The wedge 1300 is a solid body.

The wedge 1300 has a concave that sufficiently covers the top of the convex. The propagation substance (ultrasonic propagation substance) 1304 is filled into a gap between the wedge 1300 and the convex. For example, glycerin paste, which is frequently used as a contact medium, is used as the propagation substance 1304. It is obvious that a substance other than glycerin paste may be used as far as it is capable of propagating ultrasonic waves. An alternative method is to supply water from the outside or fill a gel-like substance into the gap.

The wedge 1300 is formed of a resin material. The wedge 1300 may be formed of a material generally used as a wedge for angle beam flaw detection, such as polystyrene or acrylic. However, the wedge 1300 according to the present embodiment includes reflection sections 1306*a*, 1306*b*. Inner surfaces of the reflection sections 1306*a*, 1306*b* reflect an ultrasonic wave. The reflection sections 1306*a*, 1306*b* (ultrasonic reflection members) may be formed of any material that differs in acoustic impedance from the wedge 1300 (propagation member). However, if the wedge 1300 is formed of resin, it is preferable that the reflection sections 1306*a*, 1306*b* be formed of metal such as stainless steel. An alternative method is to provide a gap instead of embedding a plate-like substance as the reflection sections 1306*a*, 1306*b*. Stated differently, the reflection sections 1306*a*, 1306*b* (ultrasonic reflection members) are formed of a gaseous substance.

Figure 13B:
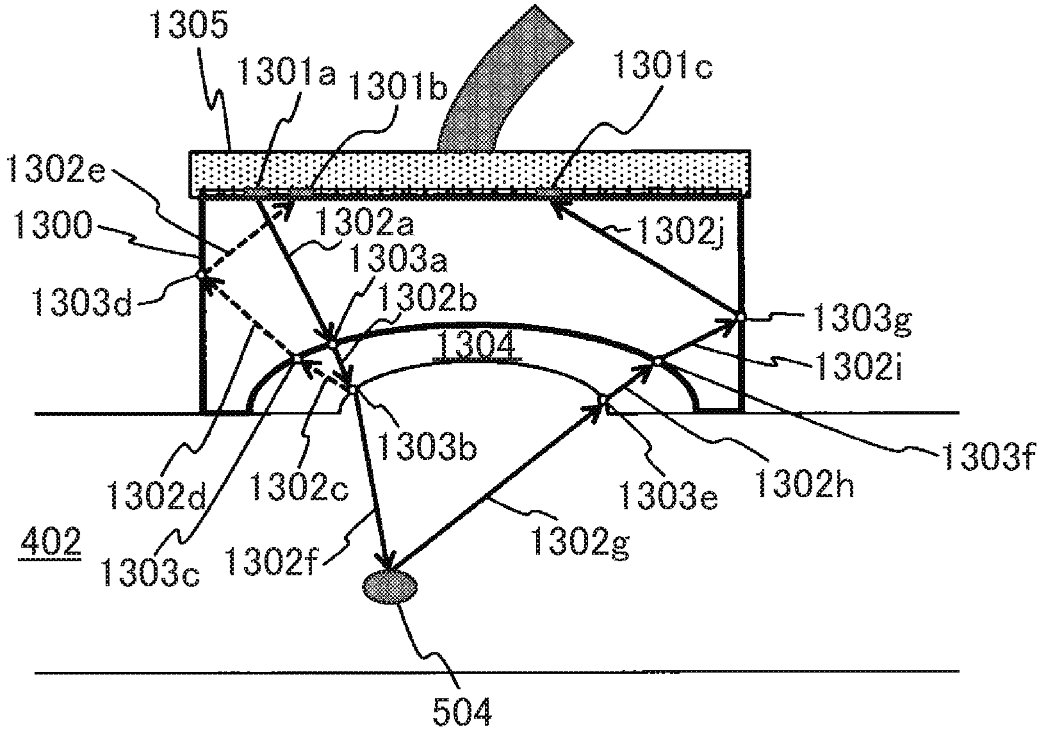
FIG. 13B is a diagram illustrating a configuration of an exemplary modification of the ultrasonic probe according to the second embodiment.

A method based on an idea similar to the above one is to shape the wedge 1300 in such a manner that its end face coincides in position with the reflection sections 1306*a*, 1306*b* as depicted in FIG. 13B. This method provides the same advantageous effects as the other methods.

That is to say, the reflection sections 1306*a*, 1306*b* (ultrasonic reflection members) are disposed in the propagation member or on its surface. It is preferable that opposing ends be shaped in the above-described manner. However, the advantageous effects are provided to a certain extent even if only one end is shaped. The role of the reflection sections and the contribution of the reflection sections to imaging are the same as described in conjunction with the first embodiment and will not be redundantly described.

Third Embodiment

Figure 14:
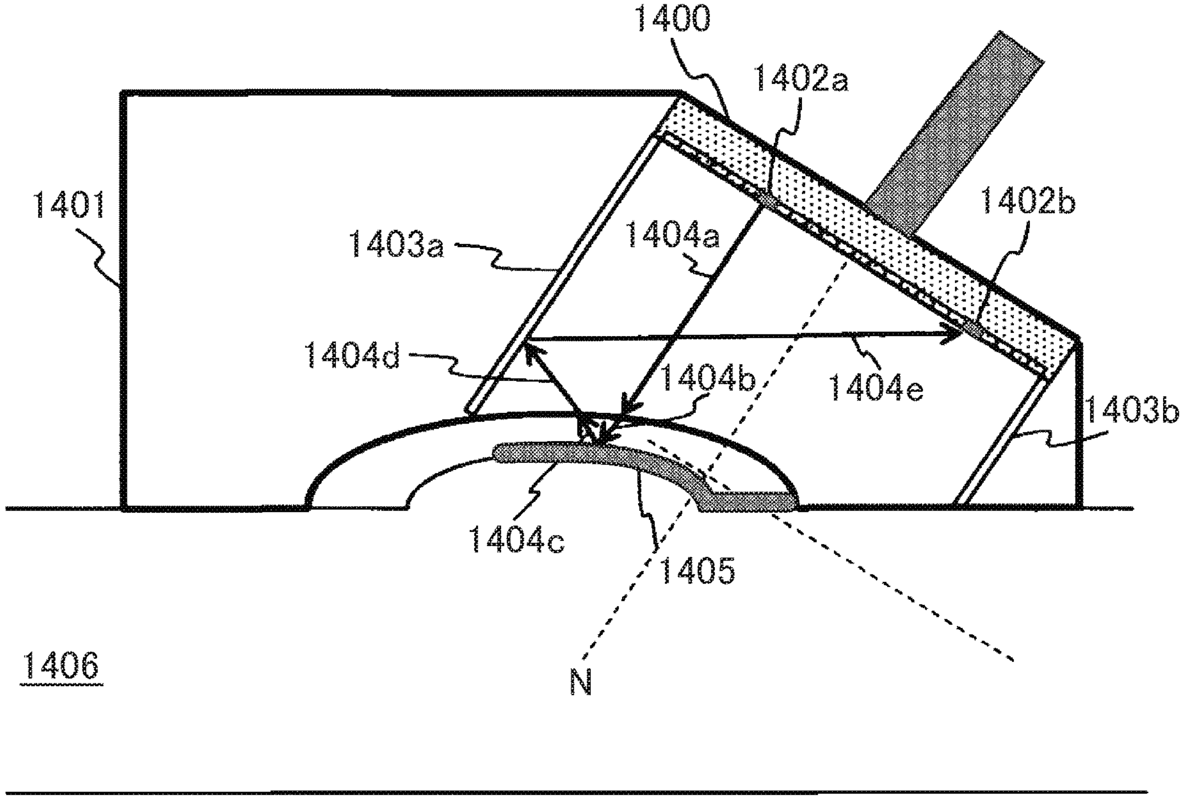
FIG. 14 is a diagram illustrating a configuration of the ultrasonic probe according to a third embodiment of the present invention.

A third embodiment of the present invention will now be described with reference to FIG. 14. The third embodiment differs from the second embodiment in the shape of the wedge. Accordingly, an array sensor 1400 and the angle of the element surface with respect to the test subject surface also differ from the counterparts in the second embodiment. In general, array sensors are capable of generating the highest-intensity ultrasonic wave in the forward direction of the element surface. Therefore, the third embodiment is suitable for a case where a strong ultrasonic wave is to be obliquely incident from a lateral surface of a weld zone.

More specifically, a surface on which the elements (oscillators) of the array sensor 1400 are disposed is perpendicular to the normal line N of a curved surface of an end portion of excess weld metal. Here, the end portion of the excess weld metal is, for example, a portion that is within a predetermined distance from the end of the excess weld metal. As the end portion of the excess weld metal has a curved surface, the gradient of the normal line N varies within a predetermined range. Therefore, one normal line N is determined, for example, from the average in the range of the gradient of the normal line N.

In the above case, too, reflection sections 1403*a*, 1403*b* are included in a wedge 1401. These reflection sections 1403*a*, 1403*b* play the same role as in the first and second embodiments. The role of the reflection sections and the contribution of the reflection sections to imaging are the same as described in conjunction with the first embodiment and will not be redundantly described.

Fourth Embodiment

Figure 15:
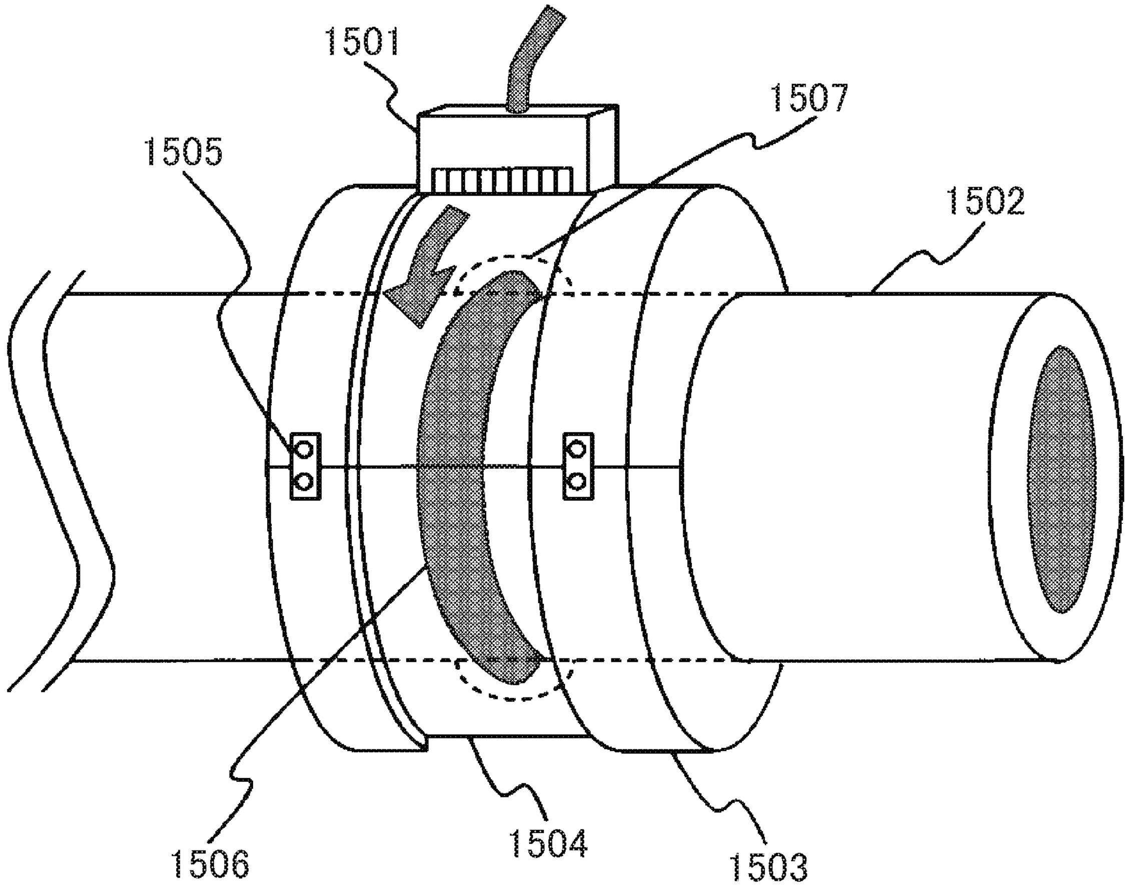
FIG. 15 is a diagram illustrating a configuration of the ultrasonic probe according to a fourth embodiment of the present invention.

A fourth embodiment of the present invention will now be described with reference to FIG. 15. The fourth embodiment is configured so that a weld zone 1506 of a piping 1502 is surrounded by a cylindrical wedge 1503, and that an array sensor 1501 disposed outside the wedge 1503 tests the inside of the weld zone 1506 by the FMC method. The wedge 1503 is cylindrical in shape. That is to say, the wedge 1503 (propagation member) is shaped like a cylinder to cover the weld zone 1506 of the piping 1502. The axial cross-section of the wedge 1503 has the same structure as described in conjunction with the second embodiment. Accordingly, although not depicted in FIG. 15, the wedge 1503 includes the reflection sections.

Further, for example, a groove 1504 is formed in the outer surface of the wedge 1503 in order to facilitate the circumferential motion of the array sensor. That is to say, the wedge 1503 (propagation member) has a groove for guiding the array sensor 1501 (ultrasonic array sensor) along the circumference of the piping 1502. Any other structure may be adopted instead of the grove as far as it facilitates the array sensor's circumferential motion above the weld zone.

Moreover, the wedge 1503 is divided so that it is easily attachable to the piping. When tests are to be performed, the wedge 1503 may be disposed to pinch the piping and then secured by connection section 1505. A propagation substance, such as glycerin paste, is filled into a gap 1507 between the wedge 1503 and the weld zone 1506. As the propagation substance, a substance commonly used for ultrasonic flaw detection may be adopted. An alternative is to adopt a structure for supplying water from the outside.

Using a cylindrical wedge including reflection sections as described above in conjunction with the present embodiment makes it possible to provide an ultrasonic flaw detection method that is not only capable of precisely extracting the surface shape of a piping weld zone, but also capable of accurately and easily performing nondestructive testing on a flaw in the piping weld zone by imaging its inside by the TFM or the aperture synthesis method.

The present invention is not limited to the foregoing embodiments, but includes various modifications. For example, the foregoing embodiments have been described in detail in order to facilitate the understanding of the present invention, and the present invention is not necessarily limited to embodiments including all the described elements. Some elements of one embodiment may be replaced by the elements of another embodiment. Further, the elements of one embodiment may be added to the elements of another embodiment. Furthermore, some elements of each embodiment may be deleted, subjected to the addition of other elements, or replaced by other elements.

Moreover, for example, the above-described elements and functions may be partly or wholly implemented by hardware by designing, for example, with an integrated circuit. Additionally, for example, the above-described elements and functions may be implemented by software by allowing a processor to interpret and execute programs that implement the respective functions. The programs, tables, files, and other items of information for implementing the functions may be stored in a memory, a recording device such as a hard disk or a solid-state drive (SSD), or a recording medium such as an IC card, an SD card, or a DVD.

The embodiments of the present invention may include the following aspects.

(1). There is provided an ultrasonic flaw detection method that causes an ultrasonic wave emitted from each of elements of an ultrasonic array sensor to reach a test target through a propagation medium and images a signal reflected from the test target by the aperture synthesis method, the total focusing method, or other similar method, wherein an ultrasonic reflection section is positioned in the inside of or on the surface of the propagation medium in such a manner that the ultrasonic wave reflected from the surface of the test target falls back on any of the elements.

(2). There is provided the ultrasonic flaw detection method as described in (1), wherein the ultrasonic reflection section is shaped like a flat plane, and wherein the flat plane is perpendicular to the array surface of the elements.

(3). There is provided the ultrasonic flaw detection method as described in (1) or (2), wherein the ultrasonic reflection section is positioned at opposing ends of the array of the elements of the ultrasonic array sensor.

(4). There is provided the ultrasonic flaw detection method as described in any one of (1) to (3), wherein the propagation medium is formed of a solid body, and wherein the ultrasonic reflection section is formed of a substance that differs in acoustic impedance from the solid body.

(5). There is provided the ultrasonic flaw detection method as described in (4), wherein the solid body is formed of resin, and wherein the ultrasonic reflection section is formed of metal.

(6). There is provided the ultrasonic flaw detection method as described in (4), wherein the solid body is formed of resin, and wherein the ultrasonic reflection section is formed of a gaseous substance.

(7). There is provided the ultrasonic flaw detection method as described in anyone of (1) to (3), wherein the propagation medium is formed of a solid body, and wherein at least one end face of the propagation medium coincides with an end of the array of the elements of the ultrasonic array sensor.

(8). There is provided the ultrasonic flaw detection method as described in anyone of (1) to (7), wherein the propagation medium is disposed on the outer surface of a weld zone of a piping, and wherein ultrasonic waveform data is recorded while the ultrasonic array sensor is moved along the outer surface of the propagation medium.

(9). There is provided an ultrasonic flaw detection apparatus including an ultrasonic array sensor, a transmitter, a propagation medium (propagation substance), a receiving/recording section, an imaging section, and an ultrasonic reflection section, wherein the ultrasonic array sensor is disposed on the surface of a test target, the transmitter transmits an ultrasonic wave from each of elements of the ultrasonic array sensor, wherein the propagation medium causes the ultrasonic wave to reach the test target, wherein the receiving/recording section receives and records a signal reflected from the test target, wherein the imaging section images the reflected signal by the aperture synthesis method, the total focusing method, or other similar method, and wherein the ultrasonic reflection section is positioned in the inside of or on the surface of the propagation medium in such a manner that the ultrasonic wave reflected from the surface of the test target falls back on any of the elements.

(10). There is provided the ultrasonic flaw detection apparatus as described in (9), wherein the ultrasonic reflection section is shaped like a flat plane, and wherein the flat plane is perpendicular to the array surface of the elements.

(11). There is provided the ultrasonic flaw detection apparatus as described in (9) or (10), wherein the ultrasonic reflection section is positioned at opposing ends of the array of the elements of the ultrasonic array sensor.

(12). There is provided the ultrasonic flaw detection apparatus as described in any one of (9) to (11), wherein the propagation medium is formed of a solid body, and wherein the ultrasonic reflection section is formed of a substance that differs in acoustic impedance from the solid body.

(13). There is provided the ultrasonic flaw detection apparatus as described in (12), wherein the solid body is formed of resin, and wherein the ultrasonic reflection section is formed of metal.

(14). There is provided the ultrasonic flaw detection apparatus as described in (12), wherein the solid body is formed of resin, and wherein the ultrasonic reflection section is formed of a gaseous substance.

(15). There is provided the ultrasonic flaw detection apparatus as described in any one of (9) to (11), wherein the propagation medium is formed of a solid body, and wherein at least one end face of the propagation medium coincides with an end of the array of the elements of the ultrasonic array sensor.

(16). There is provided the ultrasonic flaw detection apparatus as described in any one of (9) to (15), wherein the propagation medium is disposed on the outer surface of a weld zone of a piping, and wherein ultrasonic waveform data is recorded while the ultrasonic array sensor is moved along the outer surface of the propagation medium.

According to aspects (1) to (16) above, the ultrasonic reflection section is positioned in the propagation medium in such a manner that the ultrasonic wave reflected from a curved surface of the test target propagates back onto the element surface of the ultrasonic array sensor. Therefore, an ultrasonic wave propagating along a path not leading to the ultrasonic array sensor can also be used for imaging. Consequently, the overall shape of excess weld metal can be extracted. Imaging can be achieved simply by virtually increasing the number of elements by the TFM.

What is claimed is:

1. An ultrasonic probe comprising:

an ultrasonic array sensor that is formed of a plurality of oscillators to generate an ultrasonic wave;

a propagation member that is disposed between the ultrasonic array sensor and a test target to propagate the ultrasonic wave; and at least one ultrasonic reflection member that reflects the ultrasonic wave reflected and returned from the surface of or the inside of the test target, and causes the ultrasonic wave to fall on any of the oscillators;

wherein the ultrasonic reflection member has a flat surface perpendicular to a plane on which the oscillators are arrayed, and reflects the ultrasonic wave from the flat surface.

2. The ultrasonic probe according to claim 1, wherein two ultrasonic reflection members are included and disposed at opposing ends of the array of the oscillators.

3. An ultrasonic probe comprising:

an ultrasonic array sensor that is formed of a plurality of oscillators to generate an ultrasonic wave;

a propagation member that is disposed between the ultrasonic array sensor and a test target to propagate the ultrasonic wave; and at least one ultrasonic reflection member that reflects the ultrasonic wave reflected and returned from the surface of or the inside of the test target, and causes the ultrasonic wave to fall on any of the oscillators;

wherein the propagation member is formed of a solid body, and wherein the ultrasonic reflection member differs in acoustic impedance from the propagation member.

4. The ultrasonic probe according to claim 3, wherein the propagation member is formed of resin, and wherein the ultrasonic reflection member is formed of metal.

5. The ultrasonic probe according to claim 3, wherein the propagation member is formed of resin, and wherein the ultrasonic reflection member is formed of a gaseous sub stance.

6. The ultrasonic probe according to claim 3, wherein the propagation member is shaped like a cylinder to cover a weld zone of a piping.

7. The ultrasonic probe according to claim 6, wherein the propagation member includes a groove that guides the ultrasonic array sensor along the circumference of the piping.

8. The ultrasonic probe according to claim 3, wherein the plane on which the oscillators are arrayed is perpendicular to the normal line of a curved surface of an end portion of excess weld metal.

9. An ultrasonic probe comprising:

an ultrasonic array sensor that is formed of a plurality of oscillators to generate an ultrasonic wave;

a propagation member that is disposed between the ultrasonic array sensor and a test target to propagate the ultrasonic wave; and at least one ultrasonic reflection member that reflects the ultrasonic wave reflected and returned from the surface of or the inside of the test target, and causes the ultrasonic wave to fall on any of the oscillators;

wherein the ultrasonic reflection member is disposed in the inside of or on the surface of the propagation member.

10. An ultrasonic flaw detection apparatus having the ultrasonic probe according to claim 1, the ultrasonic flaw detection apparatus comprising:

a processor that generates an image of the test target in accordance with the ultrasonic wave that is reflected and returned from the surface of or the inside of the test target and incident on the oscillators through the ultrasonic reflection member and with the ultrasonic wave that is reflected and returned from the surface of or the inside of the test target and incident on the oscillators without passing the ultrasonic reflection member.

* * * * *